(12) United States Patent
Fraley et al.

(10) Patent No.: US 12,146,211 B2
(45) Date of Patent: Nov. 19, 2024

(54) CRYOGENIC PRESSURE VESSELS FORMED FROM LOW-CARBON, HIGH-STRENGTH 9% NICKEL STEELS

(71) Applicant: ArcelorMittal, Luxembourg (LU)

(72) Inventors: George Jay Fraley, Chicago, IL (US); Frederick Fletcher, Wayne, PA (US)

(73) Assignee: ArcelorMittal, Luxembourg (LU)

( * ) Notice: Subject to any disclaimer, the term of this patent is extended or adjusted under 35 U.S.C. 154(b) by 710 days.

(21) Appl. No.: 17/312,645

(22) PCT Filed: Nov. 21, 2019

(86) PCT No.: PCT/IB2019/060019
§ 371 (c)(1),
(2) Date: Jun. 10, 2021

(87) PCT Pub. No.: WO2020/128681
PCT Pub. Date: Jun. 25, 2020

(65) Prior Publication Data
US 2022/0064767 A1    Mar. 3, 2022

(30) Foreign Application Priority Data
Dec. 19, 2018 (WO) .................. PCT/IB2018/060323

(51) Int. Cl.
*C22C 38/48* (2006.01)
*C21D 1/18* (2006.01)
(Continued)

(52) U.S. Cl.
CPC .............. *C22C 38/48* (2013.01); *C21D 1/185* (2013.01); *C21D 6/004* (2013.01); *C21D 6/005* (2013.01);
(Continued)

(58) Field of Classification Search
CPC ..... C22C 38/48; C22C 38/001; C22C 38/002; C22C 38/02; C22C 38/04; C22C 38/06; C22C 38/44; C22C 38/46
See application file for complete search history.

(56) References Cited

U.S. PATENT DOCUMENTS 3,619,302 A    11/1971    Aoki et al.
4,776,900 A    10/1988    Yano et al.
(Continued)

FOREIGN PATENT DOCUMENTS

CN    101864537 A    10/2010
CN    102586683 A    7/2012
(Continued)

OTHER PUBLICATIONS

Machine Translation of WO 2015064045 A1 (Year: 2015).*
(Continued)

*Primary Examiner* — Brian D Walck
*Assistant Examiner* — Nazmun Nahar Shams
(74) *Attorney, Agent, or Firm* — Davidson Kappel LLC

(57) ABSTRACT

A cryogenic pressure vessel of formed of an ASTM A553 Type 1 cryogenic steel alloy including in wt. %: C: 0.01-0.04; Mn: up to 2.0; P: up to 0.02; S: up to 0.15; Si: up to 1.0; Ni: 7-11; Cr: up to 1.0; Mo: up to 0.75; V: up to 0.2; Nb: up to 0.1; Al: up to 0.1; and N: up to 0.01. The steel alloy may have an ultimate tensile strength of at least 900 MPa, a total elongation of at least 20%; a microstructure including between 5 and 20 area % reverted austenite and the remainder tempered martensite; a transverse Charpy impact energy of at least 27 J at −196° C.; and a lateral expansion of at least 0.381 mm at −196° C.

22 Claims, 1 Drawing Sheet

(51) Int. Cl.

| | |
|---|---|
| *C21D 6/00* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/44* | (2006.01) |
| *C22C 38/46* | (2006.01) |

(52) U.S. Cl.
CPC ............... *C21D 6/008* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/44* (2013.01); *C22C 38/46* (2013.01); *C21D 2211/001* (2013.01); *C21D 2211/004* (2013.01); *C21D 2211/008* (2013.01)

(56) References Cited

U.S. PATENT DOCUMENTS

| | | | |
|---|---|---|---|
| 5,827,379 | A | 10/1998 | Okamura et al. |
| 6,254,698 | B1 | 7/2001 | Koo et al. |
| 9,499,890 | B1 | 11/2016 | Jie |

FOREIGN PATENT DOCUMENTS

| | | |
|---|---|---|
| CN | 101359109 B1 | 2/2014 |
| CN | 104278210 A | 1/2015 |
| CN | 104745770 A | 7/2015 |
| CN | 104928592 A | 9/2015 |
| FR | 2307879 A1 | 11/1976 |
| JP | S5113308 A | 2/1976 |
| JP | 2011214098 A | 10/2011 |
| RU | 2235792 C2 | 9/2004 |
| WO | WO-2015064045 A1 * | 5/2015 ............... B21B 3/02 |
| WO | WO-2019239761 A1 * | 12/2019 ........... C21D 8/0247 |

OTHER PUBLICATIONS

Naoki Saitoh et.al. "Development of Heavy 9 wt% Nickel Steel Plates with Superior Low-Temperature Toughness for LNG Storage Tanks" Nippon Steel Technical Report No. 58 Jul. 1993. (Year: 1993).*

See Search Report of PCT/IB2019/060019 dated Feb. 27, 2020.

Ryuichi Ando et al., "Development of 7%Ni-TMCP Steel Plate for LNG Storage Tanks", ASME 2011 Pressure Vessels and Piping Conference; vol. 6: Materials and Fabrication, Parts A and B; Baltimore, Maryland, USA, Jul. 17-21, 2011, US, (Jan. 1, 2011), vol. 6, doi:10.1115/PVP2011-57250, ISBN 978-0-7918-4456-4, pp. 37-46, XP055581278.

Young Woo Kim et al., "An Experimental Study for Fatigue Performance of 7% Nickel Steels for Type B Liquefied Natural Gas Carriers", Journal of Offshore Mechanics and Arctic Engineering, US, (Jun. 1, 2016), vol. 138, No. 3, doi: 10.1115/1.4032706, ISSN 0892-7219, p. 031401, XP055581294.

Zhang J M et al., "Effect of Heat Treatment Process on Mechanical Properties and Microstructure of a 9% Ni Steel for Large LNG Storage Tanks", Journal of Materials Engineering and Performance, ASM International, Materials Park, OH, US, vol. 22, No. 12, doi:10.1007/S11665-013-0701-1, ISSN 1059-9495, (Sep. 13, 2013), pp. 3867-3871, (Sep. 13, 2013), XP035372036.

Chen Jian et al. Effects of quenching, lamellarizing and tempering process on tempering stability of 9NiCrMo steel, Chen Jian, Heat Treatment of Metals, vol. 41, No. 11, Nov. 2016, 10- 15—see English Abstract (- 陈 健等,, "两相区热处理工艺 对 9NiCrMo 钢回火稳定性的影 响", 《金属热处理》.

* cited by examiner

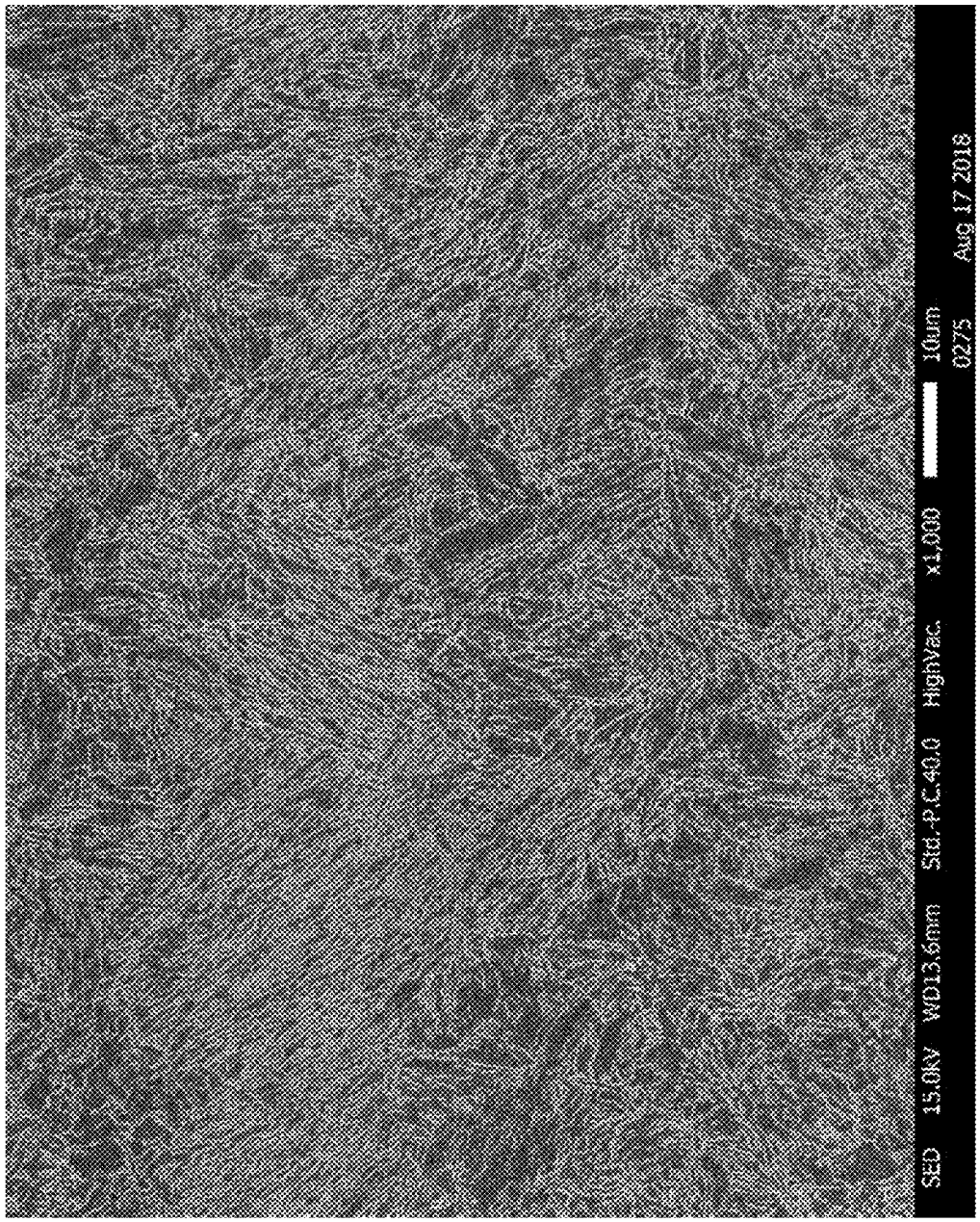

CRYOGENIC PRESSURE VESSELS FORMED FROM LOW-CARBON, HIGH-STRENGTH 9% NICKEL STEELS

FIELD OF THE INVENTION

The present invention relates to cryogenic pressure vessels formed from cryogenic steels, more specifically formed from ASTM A553 cryogenic steels. Most specifically, the invention relates to cryogenic pressure vessels formed from 9% Ni cryogenic steels that meet all the mechanical specifications of ASTM A553 alloys and have significantly higher ultimate tensile strengths than present ASTM A553 alloys.

BACKGROUND OF THE INVENTION

For decades, the steel of choice for many cryogenic service conditions and reliable construction of cryogenic pressure vessels has been ASTM A553 (herein also 9% Ni steel). This steel has a tensile strength of 690 MPa and is impact tested at −196° C. This 9% nickel steel was originally developed by the International Nickel Company. It generally has been used for construction of storage vessels for fluids such as liquid natural gas at cryogenic temperatures. While these steels have performed excellently in service, in recent years there has been interest in developing lower cost solutions for cryogenic storage.

Various steel producers have introduced new materials intended as direct substitutions for this grade. These materials are designed to achieve the strength and toughness requirements of ASTM A553 while benefiting from lower alloying cost. This provides the tank designer the opportunity to reduce tank construction cost while simultaneously meeting function and safety criteria.

SUMMARY OF THE INVENTION

The present inventors determined that rather than reducing the quantity of expensive alloying ingredients, enhancing the properties of the cryogenic steel would allow less steel to be used in the construction of such inventive cryogenic pressure vessels, by reducing the steel thickness needed for vessel fabrication. This would allow for the customer to order less material with the added benefit of lower vessel weight. Thus, there is a need in the art for a new cryogenic pressure vessel formed of a cryogenic steel that has higher strength than the present ASTM A553 alloys, and yet meets the Charpy impact energy absorption requirements of the ASTM A553 specification (minimum ASTM requirement of 27 J TCVN at −196° C.).

The present invention is a cryogenic pressure vessel of formed from an ASTM A553 cryogenic steel alloy having lower C, and additions of Mo and V compared to prior art 9% Ni steels, while having significantly higher ultimate tensile strength. The cryogenic steel alloy which forms the inventive cryogenic pressure vessel comprises in wt. %: C: 0.01-0.06; Mn: up to 2.0; P: up to 0.02; S: up to 0.15; Si: up to 1.0; Ni: 7-11; Cr: up to 1.0; Mo: up to 0.75; V: up to 0.2; Nb: up to 0.1; Al: up to 0.1; and N: up to 0.01. The cryogenic steel alloy may have an ultimate tensile strength of at least 900 MPa, a total elongation of at least 20%; a microstructure comprised of between 5 and 20 area % reverted austenite and the remainder tempered martensite; a transverse Charpy impact energy of at least 27 J at −196° C.; and a lateral expansion of at least 0.381 mm at −196° C.

The cryogenic steel alloy may more preferably comprise in wt. %: C: 0.04-0.06; Mn: 0.5-0.7; Si: 0.2-0.4; Ni: 7.5-9.5; Cr: 0.25-0.5; Mo: 0.5-0.7; P: up to 0.006; S: up to 0.002; V: up to 0.1; Nb: up to 0.05; Al: up to 0.06 wt. %; and N: up to 0.008 wt. %.

The cryogenic steel alloy may have undergone a heat treatment comprising: austenitizing at a temperature of between 750-1000° C. for 10 minutes to 3 hours; quenching to room temperature; lamellarizing at a temperature of between 600-725° C. for 10 minutes to 3 hours; cooling to room temperature in air; tempering at a temperature of between 500-620° C. for 10 minutes to 3 hours; and cooling to room temperature in air.

More preferably, the austenitization is at a temperature of between 800-950° C. for 30 to 60 minutes; the lamellarizing is at a temperature of between 625 and 700° C. for 30 to 60 minutes; and the tempering is at a temperature of 550 and 610° C. for 30 to 60 minutes.

Most preferably, the austenitizing is at a temperature of between 820-900° C. for 30 to 60 minutes; the lamellarizing is at a temperature of between 650 and 675° C. for 30 to 60 minutes; and the tempering is at a temperature of 575 and 600° C. for 30 to 60 minutes.

The cryogenic steel alloy microstructure may preferably contain between 8 and 15 area % reverted austenite and most preferably between 13 and 15 area % reverted austenite with the remainder tempered martensite.

The cryogenic steel alloy may preferably have a lateral expansion of at least 1.0 mm at −196° C., more preferably at least 1.5 mm and most preferably at least 2.0 mm.

The cryogenic steel alloy may also have a transverse Charpy impact energy of at least 50 J at −196° C., more preferably at least 100 J, and most preferably at least 150 J.

BRIEF DESCRIPTION OF THE DRAWINGS

FIG. 1 is an SEM micrograph of an alloy useful for forming the inventive cryogenic pressure vessel of the present invention.

DETAILED DESCRIPTION OF THE INVENTION

ASTM A553 Type I steel, commonly known as "9% Ni Steel," has requirements of a transverse Charpy absorbed energy of at least 27 J at −196° C., a lateral expansion of at least 0.381 mm at −196° C., and a total elongation of at least 20%. The A553 alloy must also have an ultimate tensile strength of at least 690 MPa. The inventive cryogenic pressure id formed from an alloy that meets all the mechanical requirements of the A553 alloy and has an ultimate tensile strength of at least 900 MPa.

The steel is heat treated by austenitizing/quenching, lamellarizing, and tempering. The resulting microstructure consists of predominantly martensite with significant volume fraction of reverted austenite plus carbides. The Charpy impact energy absorption of plates of the steel alloy useful in forming the inventive cryogenic pressure vessel are comparable with historic production values of ASTM A553 Type I despite the new steel exhibiting greater than 30 percent higher design strength. The broad compositional ranges of the cryogenic steel alloy used in the production of the inventive cryogenic pressure vessel are given in Table 1.

TABLE 1

|  | C | Mn | P | S | Si | Ni | Cr | Mo | V | Nb | Al | N |
|---|---|---|---|---|---|---|---|---|---|---|---|---|
| Min | 0.01 | 0 | 0 | 0 | 0 | 7 | 0 | 0 | 0 | 0 | 0 | 0 |
| Max | 0.06 | 2 | 0.02 | 0.15 | 1 | 11 | 1 | 0.75 | 0.2 | 0.1 | 0.1 | 0.01 |

More preferred compositional ranges are given in Table 2

TABLE 2

|  | C | Mn | P | S | Si | Ni | Cr | Mo | V | Nb | Al | N |
|---|---|---|---|---|---|---|---|---|---|---|---|---|
| Min | 0.04 | 0.5 | 0 | 0 | 0.2 | 7.5 | 0.25 | 0.5 | 0 | 0 | 0 | 0 |
| Max | 0.06 | 0.7 | 0.006 | 0.002 | 0.4 | 9.5 | 0.5 | 0.7 | 0.1 | 0.05 | 0.06 | 0.008 |

Plates 13 mm thick were formed of an alloy composition in Table 3.

TABLE 3

| C | Mn | P | S | Si | Ni | Cr | Mo | V | Nb | Al | N |
|---|---|---|---|---|---|---|---|---|---|---|---|
| 0.044 | 0.59 | <0.005 | <0.002 | 0.26 | 8.9 | 0.45 | 0.65 | 0.08 | 0.013 | 0.028 | <0.005 |

The plates were austenitized at 843° C. for 15 minutes and immediately water quenched. The broad austenitization temperature range for the alloys of the present invention is between 750-1000° C., more preferably between 800-950° C. and most preferably between 820-900° C. The broad austenitization time range is between 10 minutes and 3 hours, most preferably the austenitization time is 30 to 60 minutes.

After austenitization and quenching the plates were "lamellarized and tempered." This is a two-step tempering process where the plate is lamellarized for a fixed time and temperature, air cooled to room temperature, and subsequently tempered for a fixed time and temperature and again air cooled to room temperature. The plates were lamellarized at 660° C. for 50 minutes. The broad lamellarization temperature range for the alloys of the present invention is between 600-725° C., more preferably between 625 and 700° C., and most preferably between 650 and 675° C. The broad lamellarization time range is between 10 minutes and 3 hours, most preferably the lamellarization time range is between 30 to 60 minutes.

The plates were tempered at 590° C. for 25 minutes. The broad tempering temperature range for the alloys of the present invention is between 500-620° C., more preferably between 550 and 610° C., and most preferably between 575 and 600° C. The broad tempering time range is between 10 minutes and 3 hours, most preferably the tempering time range is between 30 to 60 minutes.

FIG. 1 is an SEM micrograph of an alloy used to form the present inventive cryogenic pressure vessel. The micrograph shows the microstructure thereof after austenitizing/quenching, lamellarizing, and tempering. The microstructure of the alloys is tempered martensite with interlath austenite containing lamellae. The presence of retained austenite was confirmed by x-ray diffraction. The percentage of retained austenite as well as the ultimate tensile strength (UTS) in MPa, yield strength (YS) in MPa, and total elongation % for samples of the inventive alloy are shown in Table 4. The broadest range of retained austenite in the alloys used to form the inventive cryogenic pressure vessel is between 5 and 20%, more preferably between 8 and 15%, most preferably between 13 and 15%.

TABLE 4

| Sample # | YS (MPa) | UTS (MPa) | Tot. El. (%) | % Retained Austenite |
|---|---|---|---|---|
| 1 | 729 | 964 | 23.4 | 14.6 |
| 2 | 757 | 973 | 25.3 | 12.9 |
| 3 | 871 | 989 | 25.0 | 14.7 |

The tensile results in Table 4 demonstrate that the desired minimum tensile strength requirement of 900 MPa was achieved for all tested specimens. Table 4 also demonstrates that the minimum tensile elongation of 20% specified by the ASTM A553 requirements was achieved for all specimens.

Table 5 presents results for transverse Charpy impact energy at −196° C. in Joules and the lateral expansion at −196° C. in mm for samples of the alloy used to form the inventive cryogenic pressure vessel. Clearly the alloy easily meets/exceeds the ATM A553 requirements. Thus, the alloy used to form the inventive cryogenic pressure vessel has a lateral expansion of at least 0.381 mm at −196° C., preferably at least 1.0 mm, more preferably at least 1.5 mm and most preferably at least 2.0 mm. Also, the alloy used to form the inventive cryogenic pressure vessel has a transverse Charpy impact energy of at least 27 J at −196° C., preferably at least 50 J, more preferably at least 100 J and most preferably at least 150 J.

TABLE 5

| Test # | TCVN @ −196 C (J) | Lat. Exp. @ −196 C (mm) |
|---|---|---|
| 1 | 151 | 1.73 |
| 2 | 170 | 2.39 |
| 3 | 159 | 1.45 |
| 4 | 181 | 2.01 |
| 5 | 166 | 2.08 |

What is claimed is:

1. A cryogenic pressure vessel formed from a cryogenic steel alloy, the alloy comprising in wt. %:

C: 0.01-0.06; Mn: up to 2.0; P: up to 0.02; S: up to 0.15; Si: up to 1.0; Ni: 7-11; Cr: up to 1.0; Mo: up to 0.75; V: up to 0.2; Nb: up to 0.1; Al: up to 0.1; and N: up to 0.01;

the alloy having an ultimate tensile strength of at least 900 MPa, a total elongation of at least 20%; a microstructure of between 5 and 20 area % reverted austenite and a remainder of tempered martensite; a transverse Charpy impact energy of at least 27 J at −196° C.; and a lateral expansion of at least 0.381 mm at −196° C.

2. The cryogenic pressure vessel as recited in claim 1 wherein the alloy comprises C between 0.04-0.06 wt. %.

3. The cryogenic pressure vessel as recited in claim 2 wherein the alloy comprises Mn between 0.5-0.7 wt. %.

4. The cryogenic pressure vessel as recited in claim 3 wherein the alloy comprises Si between 0.2-0.4 wt. %.

5. The cryogenic pressure vessel as recited in claim 4 wherein the alloy comprises Ni between 7.5-9.5 wt. %.

6. The cryogenic pressure vessel as recited in claim 5 wherein the alloy comprises Cr between 0.25-0.5 wt. %.

7. The cryogenic pressure vessel as recited in claim 6 wherein the alloy comprises Mo between 0.5-0.7 wt. %.

8. The cryogenic pressure vessel as recited in claim 7 wherein the alloy comprises P: up to 0.006 wt. %; S: up to 0.002 wt. %; V: up to 0.1 wt. %; Nb: up to 0.05 wt. %; Al: up to 0.06 wt. %; and N: up to 0.008 wt. %.

9. The cryogenic pressure vessel as recited in claim 1 wherein the alloy has undergone a heat treatment comprising:

austenitizing at a temperature of between 750-1000° C. for 10 minutes to 3 hours;
quenching to room temperature;
lamellarizing at a temperature of between 600-725° C. for 10 minutes to 3 hours;
cooling to room temperature in air;
tempering at a temperature of between 500-620° C. for 10 minutes to 3 hours; and
cooling to room temperature in air.

10. The cryogenic pressure vessel as recited in claim 9 wherein the austenitizing is at a temperature of between 800-950° C. for 30 to 60 minutes; the lamellarizing is at a temperature of between 625 and 700° C. for 30 to 60 minutes; and the tempering is at a temperature of between 550 and 610° C. for 30 to 60 minutes.

11. The cryogenic pressure vessel as recited in claim 10 wherein said austenitizing is at a temperature of between 820-900° C. for 30 to 60 minutes; said lamellarizing is at a temperature of between 650 and 675° C. for 30 to 60 minutes; and said tempering is at a temperature of 575 and 600° C. for 30 to 60 minutes.

12. The cryogenic pressure vessel as recited in claim 1 wherein the alloy has a microstructure of between 8 and 15 area % reverted austenite and the remainder tempered martensite.

13. The cryogenic pressure vessel as recited in claim 1 wherein the alloy has a microstructure of between 13 and 15 area % reverted austenite and the remainder tempered martensite.

14. The cryogenic pressure vessel as recited in claim 1 wherein the alloy has a lateral expansion of at least 1.0 mm at −196° C.

15. The cryogenic pressure vessel as recited in claim 14 wherein the alloy has a lateral expansion of at least 1.5 mm at −196° C.

16. The cryogenic pressure vessel as recited in claim 15 wherein the alloy has a lateral expansion of at least 2.0 mm at −196° C.

17. The cryogenic pressure vessel as recited in claim 1 wherein the alloy has a transverse Charpy impact energy of at least 50 J at −196° C.

18. The cryogenic pressure vessel as recited in claim 17 wherein the alloy has a transverse Charpy impact energy of at least 100 J at −196° C.

19. The cryogenic pressure vessel as recited in claim 18 wherein the alloy has a transverse Charpy impact energy of at least 150 J at −196° C.

20. The cryogenic pressure vessel as recited in claim 1, wherein the microstructure consists of reverted austenite and tempered martensite.

21. The cryogenic pressure vessel as recited in claim 1 wherein the microstructure consists of reverted austenite and tempered martensite, wherein the reverted austenite is in an amount between 8 and 15 area %.

22. The cryogenic pressure vessel as recited in claim 1 wherein the microstructure consists of reverted austenite and tempered martensite, wherein the reverted austenite is in an amount between 13 and 15 area %.

* * * * *